US008051383B2

(12) United States Patent  
McCampbell et al.

(10) Patent No.: US 8,051,383 B2  
(45) Date of Patent: Nov. 1, 2011

(54) GRAPHICAL CONTROLLER FOR MONITORING MULTIPLE CHEMICAL FEED CONSTITUENTS

(75) Inventors: Christopher T. McCampbell, Foothill Ranch, CA (US); Steven M. Dishon, Mission Viejo, CA (US); Martin T. Scanlan, San Diego, CA (US)

(73) Assignee: Integrity Municipal Services LLC, Poway, CA (US)

( * ) Notice: Subject to any disclaimer, the term of this patent is extended or adjusted under 35 U.S.C. 154(b) by 790 days.

(21) Appl. No.: 12/040,716

(22) Filed: Feb. 29, 2008

(65) Prior Publication Data

US 2008/0216008 A1    Sep. 4, 2008

Related U.S. Application Data

(60) Provisional application No. 60/904,281, filed on Mar. 1, 2007.

(51) Int. Cl.  
*G06F 3/048* (2006.01)
(52) U.S. Cl. .................... 715/771; 715/772
(58) Field of Classification Search .............. 715/756, 715/771, 772; 436/113  
See application file for complete search history.

(56) References Cited

U.S. PATENT DOCUMENTS

| 6,315,950 | B1 | 11/2001 | Harp et al. | |
| 6,592,736 | B2* | 7/2003 | Fulton et al. | 205/81 |
| 6,881,583 | B2 | 4/2005 | Kahle | |
| 2003/0232447 | A1* | 12/2003 | Kahle | 436/113 |

OTHER PUBLICATIONS

Bernie Beemster et al.; "Strategies of Using an Online Analyzer for Water Chlorination Process Monitoring and Control"; ASA Publication No. 191; Published in WaterWorld, May 2009; pp. 1-4.

* cited by examiner

*Primary Examiner* — Sara England  
(74) *Attorney, Agent, or Firm* — The Webb Law Firm

(57) ABSTRACT

The graphical controller provides a graphic user interface for monitoring and managing multiple chemical feed constituents, and displays a breakpoint curve specific to water being treated and a given ammonia set point, based on operator input and data from measurement of total chlorine, free chlorine, monochloramine, combined chlorine, ammonia residual, and the like. The graphical interface determines where on the curve the process is, provides immediate visual feedback to the water treatment operator and allows control of chlorine and ammonia feed rates to a fixed or new chloramination and ammonia set point.

19 Claims, 4 Drawing Sheets

GRAPHICAL CONTROLLER FOR MONITORING MULTIPLE CHEMICAL FEED CONSTITUENTS

CROSS-REFERENCES TO RELATED APPLICATIONS

This application is based upon provisional application Ser. No. 60/904,281, filed Mar. 1, 2007, and which is incorporated in its entirety by reference herein.

BACKGROUND OF THE INVENTION

The present invention relates generally to graphical controllers, and more particularly relates to a graphical controller interface for monitoring multiple chemical feed constituents, such as for monitoring chloramination of a municipal water supply.

Disinfection chemicals such as chlorine, chloramines, chlorine dioxide, hydrogen peroxide, and the like, commonly are added to raw water to make it safe to drink. Chlorine is one of the most common disinfectants but due to health problems associated with disinfection byproducts such as trihalomethanes, many water producers are changing over to products such as chloramines (chlorine combined with ammonia).

Chloramination can be difficult to control because of the formation of monochloramine and the subsequent formation of dichloramine and trichloramine as the proportion of chlorine to ammonia exceeds the stoichiometric ratio of approximately 5 to 1 (by weight). Chloramine is currently commonly measured by a chlorine monitor, and as the chlorine to ammonia ratio rises above 5:1 (by weight), the measured chlorine level drops until the ammonia has been completely reacted and destroyed (breaking to free chlorine), at which time the total chlorine residual begins to rise again. An operator observing a total chlorine monitor can therefore read the same level of measured total chlorine for up to three different chlorine feed rates and be unsure where they are in the process. The objective with chloramine disinfection is to maximize the yield of monochloramine, without forming dichloramine or trichloramine, which have odor and taste concerns. Breaking to free chlorine may be used to remove chloramines from purchased water or to "shock" some distribution systems as part of a maintenance program.

Currently water chloramination disinfection operators are required to take readings from multiple analyzers and infer whether the stage of chloramination indicates monochloramine production, monochloramine destruction, free chlorine, and the like. For example if ammonia is present, the process is either in monochloramine production or destruction; if no ammonia is present and free chlorine is present, then the process has exceeded the "breakpoint," and no chloramines remain. Water disinfection operators are frequently confused as to the meaning and interaction of the multiple analyzer readings, and may not have the ability to infer the correct stage in the chloramination process.

Another known method for monitoring water chloramination involves adding a color-forming reagent that reacts with monochloramine to a sample of the water, allowing the sample to be calorimetrically analyzed to determine the amount of monochloramine present. However, the method uses toxic chemicals, and the time for analysis to be completed is excessive for many control system applications. Another water chloramination control system is known that compares the concentration of aqueous higher chloramines to aqueous ammonia to optimize the ratio of added ammonia to chlorine, using spectroscopic measurements of free iodine produced from the reaction of potassium iodide with chlorine and monochloramine.

Chloramination control varies from water treatment agency to agency and in many cases must be inferred by calculation with the data available, and in many cases is poorly controlled, resulting in overfeed of ammonia or chorine, which can result in control problems causing nitrification (and bacterial growth), or taste and odor problems, respectively, or in the worst case, inadequate disinfection of the public water supply. There is consequently a need for a graphical controller for monitoring multiple chemical feed constituents, which would allow for improved control of chloramination. The present invention addresses this and other needs.

SUMMARY OF THE INVENTION

Briefly, and in general terms, the present invention provides for a graphical controller interface for monitoring multiple chemical feed constituents, that is set up to graph the breakpoint curve specific to the water being treated and a given ammonia set point. The monitor picks and displays a graph of the given installation's breakpoint curve from operator input and available data from measurement devices (total chlorine, free chlorine, monochloramine, combined chlorine, ammonia residual, etc.). This allows a direct graphical interface to determine where on the curve the process is, provides immediate visual feedback to the water treatment operator and allows control of chlorine and ammonia feed rates to a fixed or new chloramination and ammonia set point.

Accordingly, the present invention provides for a graphical chemical feed controller interface for monitoring multiple chemical feed constituents for a chemical treatment plant, including means for communicating with a user; a display for displaying a plurality of chemical feed related parameters; a display interface for enabling the user to cause the display to initiate a display of a menu of the plurality of chemical feed related parameters; an input interface for enabling the user to selectively assign values for the chemical feed related parameters in the menu; and means for causing the display to display a real time graphical representation of the plurality of chemical feed related parameters along a graphical illustration of a breakpoint curve for the chemical treatment plant calculated from measured values and assigned values of the chemical feed related parameters.

In a broad aspect, the means for communicating with a user includes a touch screen or other human-machine interface, and the display interface includes a touch screen display having an image that the user selects to initiate the display of the menu. In another aspect, the input interface includes an interface for enabling the user to selectively change one of the values so displayed; and means for automatically updating other ones of the values of the displayed parameters when such a change is made.

In a presently preferred aspect, the chemical treatment plant is a water chloramination plant, and the graphical illustration of a breakpoint curve is specific to the water being treated and a given ammonia set point. Another aspect of this is that a graphical representation of a locus of progress of chloramination on the breakpoint curve is calculated from user input and measured values relating to total chlorine, free chlorine, monochloramine, combined chlorine, and ammonia residual.

In another broad aspect of the invention, the graphical controller of the invention typically includes a digital processor that controls the displaying of a plurality of screens, including user selectable graphic on-screen buttons for setting the values of various process operating parameters, such as for controlling the multiple chemical feed constituents for the chloramination process. Depending on the on-screen button touched by a user, the processor causes different graphics to be displayed on the screens, provides graphic representations of the effect on the supply of multiple chemical feed constituents caused by changes to the settings, and may also provide displays of alarm conditions and other information.

Other features and advantages of the present invention will become more apparent from the following detailed description of the preferred embodiment in conjunction with the accompanying drawings, which illustrate, by way of example, the operation of the invention.

DETAILED DESCRIPTION OF THE PREFERRED EMBODIMENTS

Chloramination control of drinking water is difficult since the total chlorine reading is a combination of combined and free chlorine. The combined chlorine value is dependent on the specific ratio of chlorine to ammonia and as chlorine is increased the overall value of chloramination may go up or down depending on the ratio to ammonia, and process set points must be extrapolated and inferred.

The present invention accordingly provides for a device that takes input from analyzers (combined chlorine, free chlorine, total chlorine, monochloramine, ammonia, water flow rate, chemical pump stroke setting, etc.) and provides a graphical display demonstrating the current process condition compared to a probable range of conditions for a given set of parameters. This device can be used with numerous disinfection chemicals (chlorine, chloramines, chlorine dioxide, hydrogen peroxide, etc.).

For chloramination, multiple graphs would be available based on the concentration of ammonia fed. The graphical display would then provide the operator a direct indication of where they are at in the process. The correct graph would be displayed based on process and/or operator input. The operator may use this device to pace chemical pumps to maintain a given set point or achieve a new set point. Chemical ratio control may be fixed or may also be a control parameter.

To provide a graphical process representation of the chloramination process currently requires initially testing the water to generate graphs for a constant level of one chemical (ammonia) while varying another (chlorine). Each graph in this case would be chlorine added as the X axis and chlorine measured as the Y axis for a constant feed rate of ammonia to the water. Multiple graphs would be created for different levels of ammonia and further graphs could be inferred for values between the multiple levels of ammonia measured. These graphs would be loaded on the device or generated, and would be displayed based on the ammonia being fed. The current process parameters of chlorine added (derived from initial chlorine in water plus chlorine feed rate as determined by chlorine concentration, weight of chemical solution, chemical pump flow rate and water flow rate) versus the chlorine measured (combined, total and free chlorine analyzers) would be plotted as a point on the graph displayed.

Figure 1:
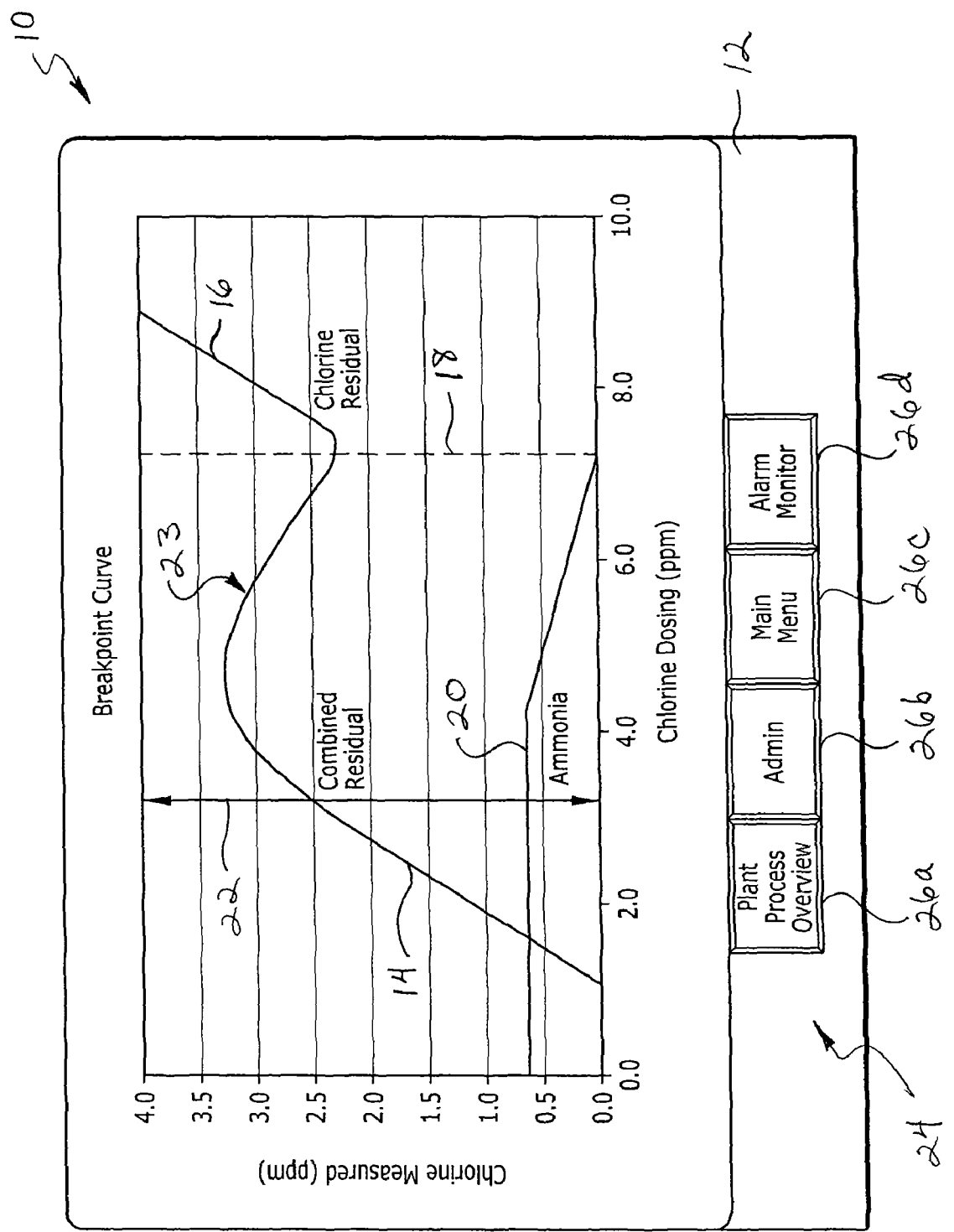
FIG. 1 is a screen shot of a touch screen display of the graphical controller of the invention, showing an overview graph of chlorine added as the X axis and chlorine measured as the Y axis for a constant feed rate of ammonia to the water, as well as menu screen buttons. The vertical line on the graph indicates the current process location.

Referring to the drawings, FIG. 1 illustrates a screen shot of the graphical controller 10, displayed on a touch screen display 12, and showing an overview graph of the progression of the combined residual chlorine 14 and chlorine residual 16 past breakpoint 18, for a continued chlorine dosing of a quantity of water with a constant feed rate of ammonia 20, with the X axis representing chlorine added in ppm, and the Y axis representing chlorine measured in ppm. The vertical line 22 on the graph indicates the current locus in the breakpoint curve 23 for the chloramination process. This allows a direct graphical interface to determine where on the curve the process is, provides immediate visual feedback to the water treatment operator and allows control of chlorine and ammonia feed rates to a fixed or new chloramination and ammonia set point. The vertical line is based on the feed rate of chlorine in ppm, and is calculated by determining the flow rate of the chlorine by weight (e.g., for sodium hypochlorite this is based on pump flow rate times the chlorine concentration) and dividing it by the flow rate of water (e.g., gpm times 8.34 lbs/gal) and multiplied by 1 million to provide the feed rate in parts per million. At the bottom 24 of the display screen of the graphical controller, the display includes menu screen buttons 26a, 26b, 26c, 26d allowing the selection of other display views such as "Plant Process Overview," "Admin," "Main Menu," and "Alarm Monitor." The "Admin" menu requires a password, and then opens up a screen with menu screen buttons for accessing a chloramine PID monitor, graphics library, set-up wizard, alarm information, and the like.

Figure 2:
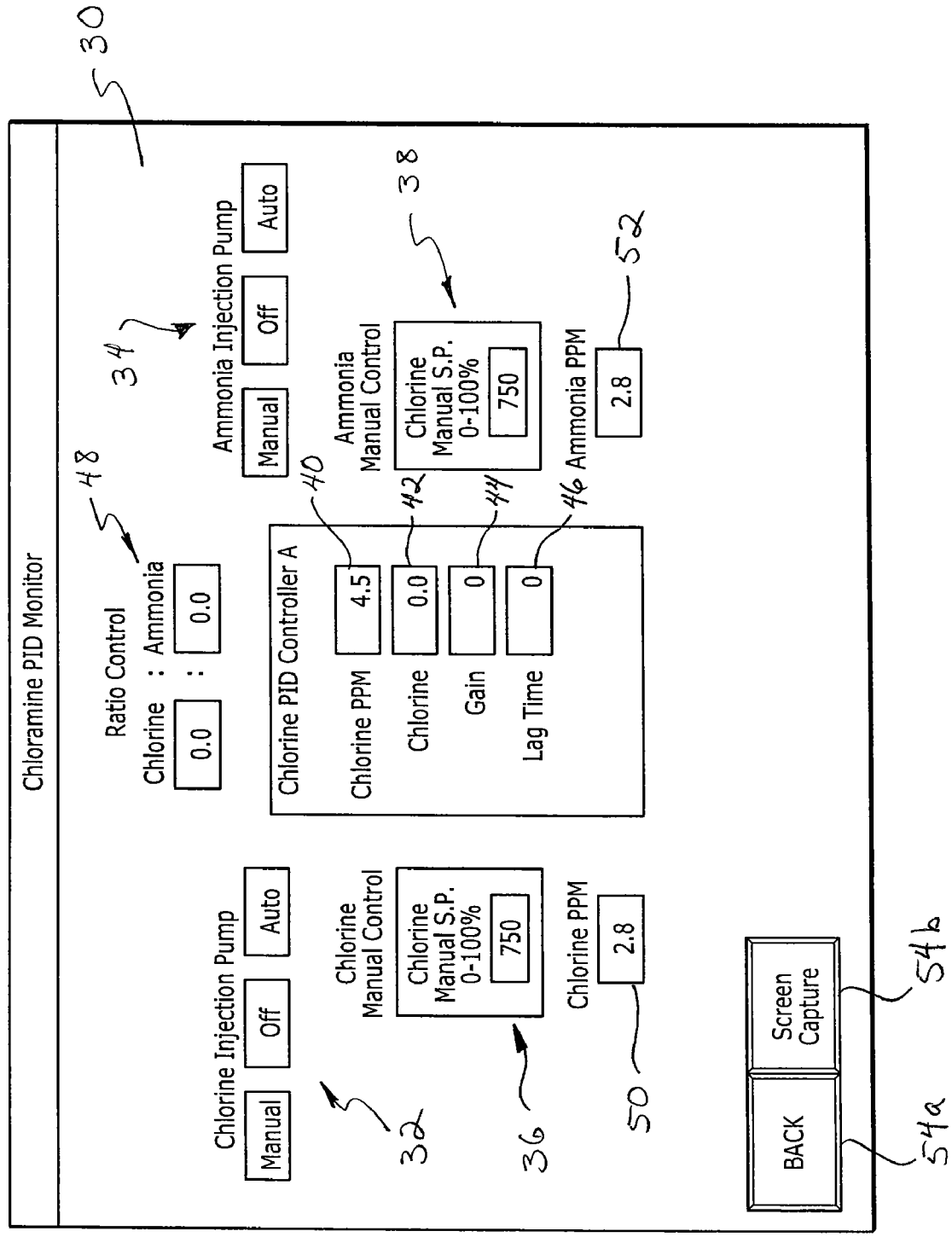
FIG. 2 is a screen shot of a touch screen display of the graphical controller of the invention, showing a chloramine PID monitor screen displaying chlorine pump control on/off status, chlorine PID control on/off status, chlorine PID setpoint ppm, ratio control of chlorine to ammonia, chlorine ratio control on/off status, ammonia ratio control on/off status, chlorine ppm, ammonia ppm, chlorine output in percent, ammonia output in percent, ammonia injection on/off status, ammonia PID control on/off status, and ammonia PID setpoint ppm, and menu screen buttons.

FIG. 2 illustrates another screen shot of the graphical controller, showing a chloramine PID (proportional-integral-derivative) controller monitor screen 30 displaying chlorine injection pump manual/auto and on/off control status 32, ammonia injection pump manual/auto and on/off control status 34, chlorine manual control set point status 36, ammonia manual control set point status 38, chlorine PID controller chlorine PPM set point 40, free chlorine status 42, gain 44 and lag time 46, ratio control of chlorine to ammonia 48, chlorine PPM 50, ammonia PPM 52, and menu screen buttons 54a and 54b such as "BACK" and "Screen Capture." The chloramine PID monitor is a subscreen under the "Admin" menu accessible from the screen of FIG. 1.

Figure 3:
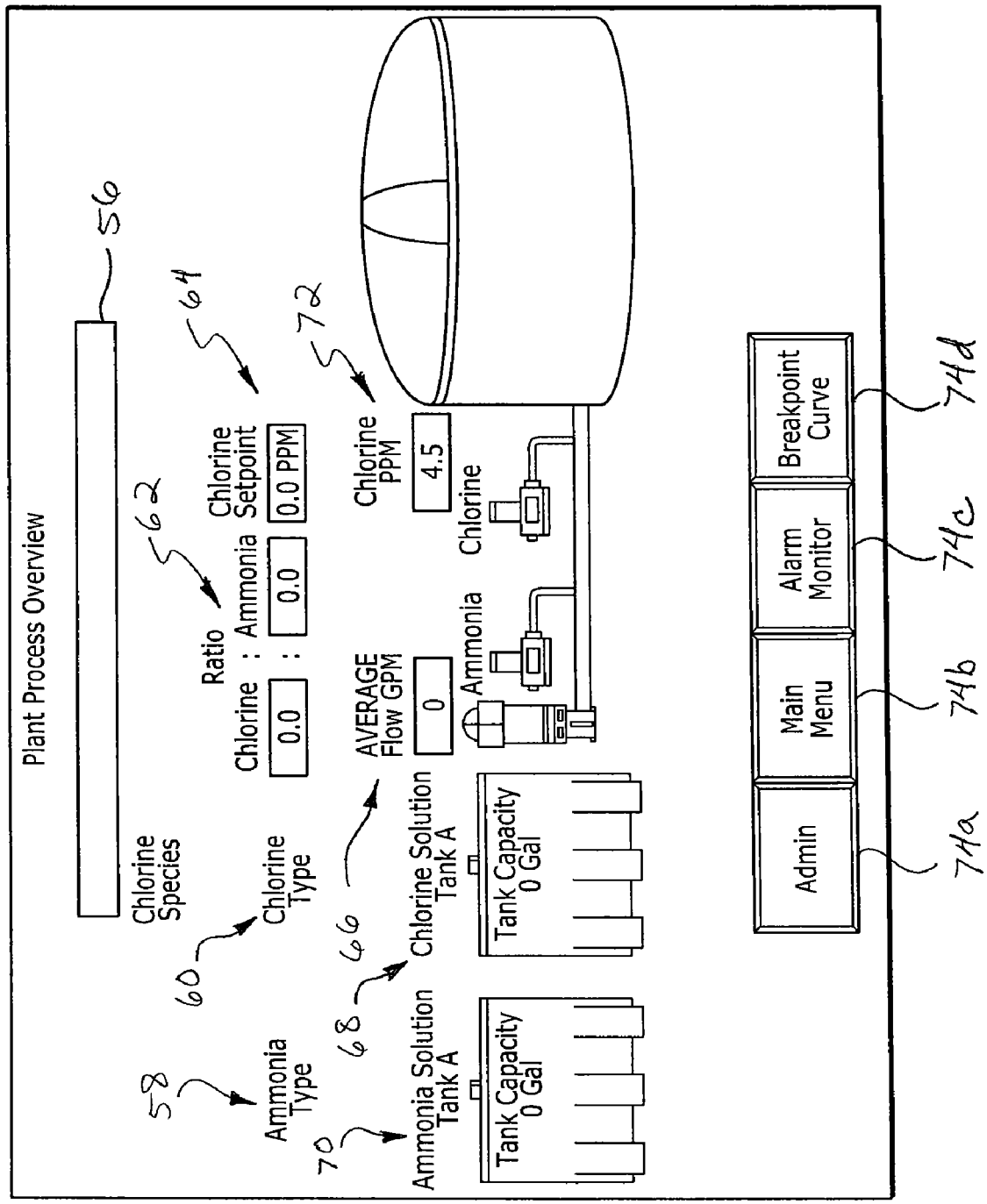
FIG. 3 is a screen shot of the graphical controller, showing a plant process overview, showing representations of the chlorine species, ammonia type, chlorine type, chlorine to ammonia ratio, chlorine set point, average ammonia flow rate, volume contents of a hypochlorite tank, the volume contents of an ammonia tank, and chlorine solution concentration; as well as menu screen buttons.

FIG. 3 illustrates another screen shot of the graphical controller, showing a plant process overview, displaying the chlorine species 56, ammonia type 58, chlorine type 60, chlorine: ammonia ratio 62, the chlorine set point 64 in ppm, the average ammonia flow rate 66 in gpm, a representation of the volume contents of a hypochlorite tank 68 in gallons, the volume contents of an ammonia tank 70 in gallons, and chlorine solution concentration 72 in ppm; and menu screen buttons 74a, 74b, 74c, and 74d, such as "Admin," "Main Menu," "Alarm Monitor", and "Breakpoint Curve."

Figure 4:
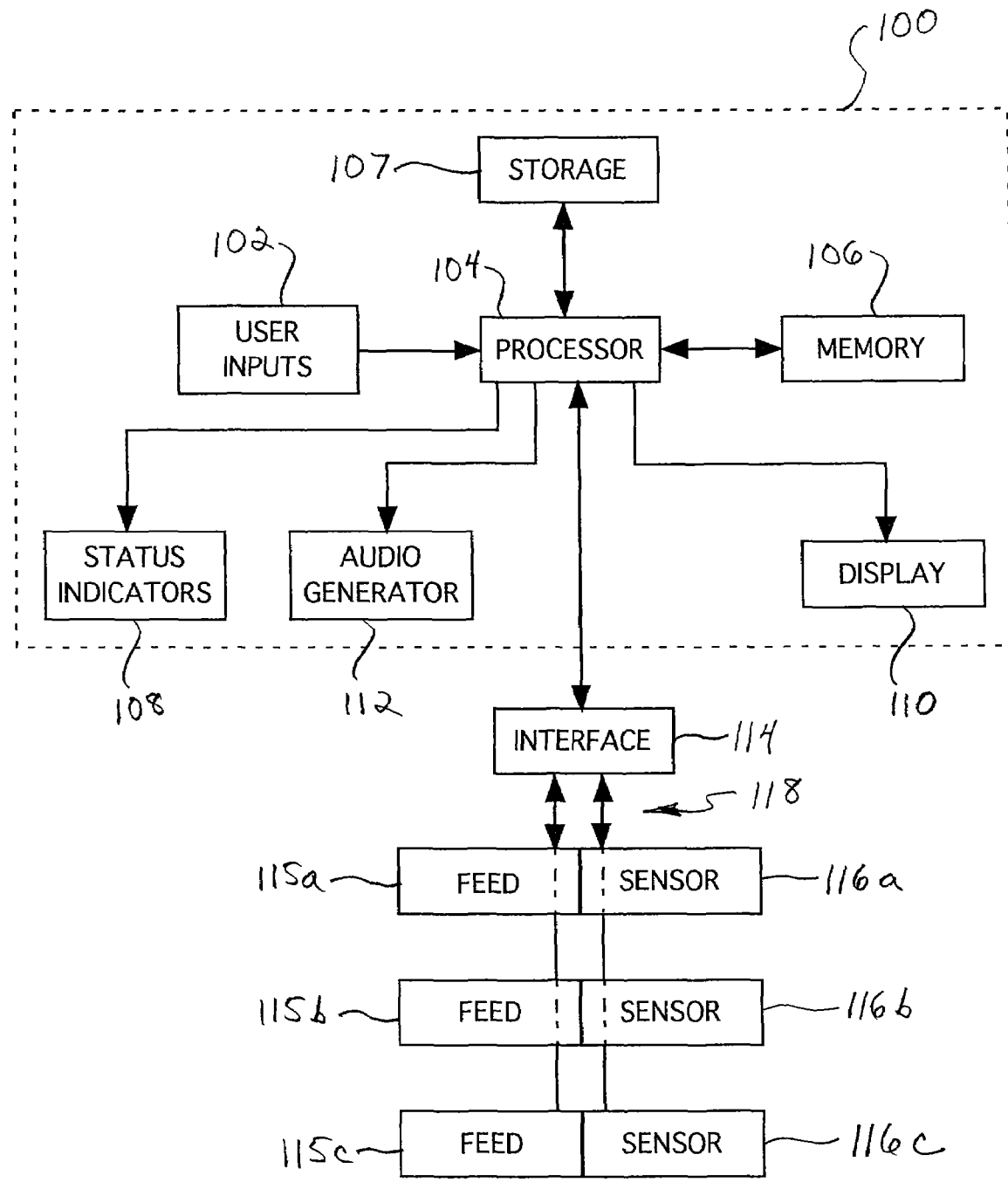
FIG. 4 is a block diagram illustrating operational details of the graphical controller of the present invention.

FIG. 4 is a block diagram illustrating operational details of the graphical controller of the present invention. Generally, the graphical controller 100 includes user inputs 102, a processor 104 and memory 106 which may include read only memory, random access memory or both. The memory may be used to store current settings, system status, measured input data and control software to be executed by the computer. The processor may also be connected to a storage device 107, such as battery protected memory, a hard drive, a floppy drive, a magnetic tape drive or other storage media for storing input data and associated process operating parameters. The processor accepts input received from the user inputs to control the graphical controller. The graphical controller may also include status indicators 108, a display 110 for displaying input data and controller settings, and an audio generator 112 for providing audible indications of the status of the graphical controller.

The display typically includes touch sensitive screen elements, such as, for example only and not by way of limitation, infrared touch screen elements, to allow for actuation of on-screen buttons. The graphical controller includes an interface 114 for providing control signals from the processor to control multiple chemical feed constituents 115a, 115b, 115c, and also for receiving signals from sensors 116a, 116b, 116c associated with the multiple chemical feed constituents indicative of measurements of such data as quantity and flow. The interface may include a local or wide area network connection, for example. One or more cables 118 having an appropriate number of conductors is used to connect the sensors for the multiple chemical feed constituents to an appropriate connector of the interface.

An operator can use the device of the present invention to have chemical metering pumps automatically pace to maintain a desired set point or achieve a new set point. The ratio between chemicals could be set (5:1) to pace to one another or allowed to float if additional analyzers (free ammonia, etc.) are available for process input. Additional monitoring and controls for chemical tank levels, process flow and reservoir management requirements are provided with the device.

We claim:

1. A graphical chemical feed controller for monitoring multiple chemical feed constituents for a chemical treatment plant, comprising:
   a computer having a memory with program instructions, which are executed by a processor;
   a display in communication with the processor and configured for displaying a plurality of chemical feed related parameters;
   a display interface for enabling the user to cause said display to initiate a display of a menu of said plurality of chemical feed related parameters; and
   an input interface in communication with the processor and configured for enabling the user to selectively assign values for the chemical feed related parameters in the menu;
   wherein the processor is further configured for causing said display to display a real time graphical representation of said plurality of chemical feed related parameters along a graphical illustration of a breakpoint curve for the chemical treatment plant calculated from measured values and assigned values of the chemical feed related parameters, and wherein the graphical representation of the breakpoint curve further comprises a plot of a current combined chlorine measurement.

2. The graphical chemical feed controller of claim 1, wherein the input interface comprises a touch screen.

3. The graphical chemical feed controller of claim 1, wherein the display interface comprises an image that the user selects to initiate the display of the menu.

4. The graphical chemical feed controller of claim 1, wherein the input interface comprises:
   an interface for enabling the user to selectively change at least one of the values displayed; and
   the processor is further configured for automatically updating other ones of the values of the displayed parameters when such a change is made.

5. The graphical chemical feed controller of claim 1, wherein said chemical treatment plant comprises a water chloramination plant, and said graphical illustration of a breakpoint curve is specific to the water being treated and a given ammonia set point.

6. The graphical chemical feed controller of claim 1, wherein said chemical treatment plant comprises a water chloramination plant, and wherein a graphical representation of a locus of progress of chloramination on the breakpoint curve is calculated from user input and measured values relating to at least one of the following: total chlorine, monochloramine, combined chlorine, ammonia residual, or any combination thereof.

7. A chemical feed control system for a water chloramination plant configured to treat at least one water stream, comprising:
   at least one chemical feed arrangement having at least one sensor associated therewith, wherein the at least one sensor is configured to measure chemical feed parameter data, including at least one of chemical level and flow rate; and
   a controller comprising:
      a memory having program instructions, which are executed by a processor;
      an input interface in communication with the processor and configured to enable a user to provide user data input;
      a display in communication with the processor and configured to display graphical data to the user; and
      a chemical feed data interface in communication with the processor and the at least one chemical feed arrangement and configured to facilitate data exchange between the processor and the at least one chemical feed arrangement;
   wherein the processor is further configured to generate, on the display, a graphical representation of at least one breakpoint curve specific to the at least one water stream, and wherein the graphical representation of the breakpoint curve further comprises a plot of a current combined chlorine measurement.

8. The chemical feed control system of claim 7, wherein the breakpoint curve is generated based upon at least one of the following: at least a portion of the user data input, an ammonia set point, at least a portion of the measured chemical feed parameter data, or any combination thereof.

9. The chemical feed control system of claim 7, wherein the at least one chemical feed arrangement comprises at least one pump, and wherein the at least one pump is operated based upon at least a portion of the user data input.

10. The chemical feed control system of claim 7, wherein the at least one chemical feed arrangement comprises at least one pump, and wherein the at least one pump is automatically operated by the processor.

11. The chemical feed control system of claim 7, wherein the processor is further configured to display a chloramination value based upon the relationship between the plot of the current combined chlorine measurement and the graphical representation of the breakpoint curve.

12. The chemical feed control system of claim 7, wherein the at least one breakpoint curve is at least one of the following: pre-loaded on the controller, manually-derived, generated in real time, an actual breakpoint curve, an inferred breakpoint curve, or any combination thereof.

13. The chemical feed control system of claim 7, further comprising a plurality of graphical representations of breakpoint curves, each based upon at least one respective constant ammonia set point.

14. The chemical feed control system of claim 7, wherein the at least one breakpoint curve comprises data representative of at least one of the following:
combined residual chlorine, chlorine residual past breakpoint, chlorine dosing level, quantity of water, feed rate of ammonia, chlorine measured, current locus, or any combination thereof.

15. The chemical feed control system of claim 7, wherein the processor is further configured to generate, on the display, at least one chlorine proportional-integral-derivative (PID) interface.

16. The chemical feed control system of claim 15, wherein the at least one chlorine PID interface facilitates configurable user control of at least one of the following: the at least one chemical feed arrangement, at least one pump, at least one control set point, or any combination thereof 17. The chemical feed control system of claim 7, wherein the processor is further configured to generate, on the display, at least one plant process overview interface.

18. The chemical feed control system of claim 17, wherein the at least one plant process overview interface display data representative of at least one of the following: chlorine species, ammonia type, chlorine type, chlorine:ammonia ratio, chlorine set point, average ammonia flow rate, volume of a process tank, volume of a hypochlorite tank, volume of an ammonia tank, chlorine concentration, or any combination thereof.

19. The chemical feed control system of claim 7, further comprising at least one audio generator in communication with the processor and configured to generate an audible indication of at least one condition of the chemical feed control system.

* * * * *

UNITED STATES PATENT AND TRADEMARK OFFICE
CERTIFICATE OF CORRECTION

| | | |
|---|---|---|
| PATENT NO. | : 8,051,383 B2 | Page 1 of 1 |
| APPLICATION NO. | : 12/040716 | |
| DATED | : November 1, 2011 | |
| INVENTOR(S) | : Christopher T. McCampbell et al. | |

It is certified that error appears in the above-identified patent and that said Letters Patent is hereby corrected as shown below:

Face of Patent, Column 2, Item (56) OTHER PUBLICATIONS, Line 2, delete "Chloromination" and insert -- Chloramination --

Column 8, Line 5, Claim 16, delete "thereof" and insert -- thereof. --

Signed and Sealed this
Third Day of April, 2012

David J. Kappos
*Director of the United States Patent and Trademark Office*